(12) United States Patent
Hodjat et al.

(10) Patent No.: US 10,956,823 B2
(45) Date of Patent: Mar. 23, 2021

(54) DISTRIBUTED RULE-BASED PROBABILISTIC TIME-SERIES CLASSIFIER

(71) Applicant: Cognizant Technology Solutions U.S. Corporation, College Station, TX (US)

(72) Inventors: Babak Hodjat, Dublin, CA (US); Hormoz Shahrzad, Dublin, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 871 days.

(21) Appl. No.: 15/481,992

(22) Filed: Apr. 7, 2017

(65) Prior Publication Data
US 2017/0293849 A1    Oct. 12, 2017

Related U.S. Application Data

(60) Provisional application No. 62/320,412, filed on Apr. 8, 2016.

(51) Int. Cl.
| | | |
|---|---|---|
| G06N 5/02 | (2006.01) | |
| G06N 3/12 | (2006.01) | |

(52) U.S. Cl.
CPC ............. G06N 5/025 (2013.01); G06N 3/126 (2013.01)

(58) Field of Classification Search
CPC ................................ G06N 5/025; G06N 3/126
See application file for complete search history.

(56) References Cited

U.S. PATENT DOCUMENTS

| | | | |
|---|---|---|---|
| 5,845,266 A | 12/1998 | Lupien et al. | 705/37 |
| 5,920,848 A | 7/1999 | Schutzer et al. | 705/42 |

(Continued)

FOREIGN PATENT DOCUMENTS

| | | | |
|---|---|---|---|
| EP | 2422276 | 2/2012 | G06F 15/173 |
| EP | 2422278 | 2/2012 | G06F 15/18 |

(Continued)

OTHER PUBLICATIONS

Berg "Fuzzy Classification Using Probability-Based Rule Weighting", IEEE, 2002 (Year: 2002).*

(Continued)

*Primary Examiner* — Ann J Lo
*Assistant Examiner* — Van C Mang
(74) *Attorney, Agent, or Firm* — Dawn-Marie Bey; Bey & Cotropia PLLC

(57) ABSTRACT

In many environments, rules are trained on historical data to predict an outcome likely to be associated with new data. Described is a ruleset which predicts the probability of a particular outcome. Roughly described, an individual identifies a ruleset, where each of the rules has a plurality of conditions and also indicates a rule-level probability of a predetermined classification. The conditions indicate a relationship (e.g. '<' or '!<') between an input feature and a corresponding value. The rules are evaluated against input data to derive a certainty for each condition, and aggregated to a rule-level certainty. The rule probabilities are combined using the rule-level certainty values to derive a probability output for the ruleset, which can be used to provide a basis for decisions. In an embodiment, the per-condition certainty values are fuzzy values aggregated by fuzzy logic. A novel genetic algorithm can be used to derive the ruleset.

21 Claims, 10 Drawing Sheets

(56) References Cited

U.S. PATENT DOCUMENTS

| | | | |
|---|---|---|---|
| 5,930,780 A | 7/1999 | Hughes et al. | 706/13 |
| 6,240,399 B1 | 5/2001 | Frank et al. | 705/36 |
| 6,249,783 B1 | 6/2001 | Crone et al. | 707/2 |
| 6,941,287 B1 * | 9/2005 | Vaidyanathan | G06K 9/6229 706/12 |
| 7,013,344 B2 | 3/2006 | Megiddo | 709/232 |
| 7,370,013 B1 | 5/2008 | Aziz et al. | 705/40 |
| 7,444,309 B2 | 10/2008 | Branke et al. | 706/13 |
| 8,065,244 B2 | 11/2011 | Chen et al. | |
| 8,527,433 B2 | 9/2013 | Hodjat et al. | 706/12 |
| 8,768,811 B2 | 7/2014 | Hodjat et al. | 705/36 R |
| 8,909,570 B1 * | 12/2014 | Hodjat | G06N 3/126 706/13 |
| 8,918,349 B2 | 12/2014 | Hodjat et al. | |
| 8,977,581 B1 | 3/2015 | Hodjat et al. | |
| 9,002,759 B2 | 4/2015 | Hodjat et al. | |
| 9,466,023 B1 | 10/2016 | Shahrzad et al. | G06N 3/086 |
| 9,489,630 B2 | 11/2016 | Achin et al. | |
| 10,268,953 B1 | 4/2019 | Fink et al. | |
| 10,430,709 B2 | 10/2019 | Shahrzad et al. | |
| 2002/0019844 A1 | 2/2002 | Kurowski et al. | 709/201 |
| 2003/0149603 A1 | 8/2003 | Ferguson et al. | |
| 2003/0158887 A1 | 8/2003 | Megiddo | 709/201 |
| 2004/0210545 A1 | 10/2004 | Branke et al. | 706/45 |
| 2004/0254901 A1 | 12/2004 | Bonabeau et al. | 706/13 |
| 2005/0033672 A1 | 2/2005 | Lasry et al. | 705/35 |
| 2005/0187848 A1 | 8/2005 | Bonissone et al. | 705/36 |
| 2005/0198103 A1 | 9/2005 | Ching | 709/200 |
| 2007/0100907 A1 | 5/2007 | Bayer | 707/203 |
| 2007/0143198 A1 | 6/2007 | Brandes et al. | 705/36 R |
| 2007/0143759 A1 | 6/2007 | Ozgur et al. | 718/102 |
| 2007/0185990 A1 | 8/2007 | Ono et al. | 709/224 |
| 2008/0071588 A1 | 3/2008 | Eder | 705/7 |
| 2008/0228644 A1 | 9/2008 | Birkestrand et al. | 705/40 |
| 2009/0125370 A1 | 5/2009 | Blondeau et al. | 705/9 |
| 2009/0307638 A1 | 12/2009 | McConaghy | |
| 2010/0030720 A1 | 2/2010 | Stephens | 706/52 |
| 2010/0182935 A1 | 7/2010 | David | 370/254 |
| 2010/0274736 A1 | 10/2010 | Hodjat et al. | 705/36 R |
| 2010/0274742 A1 | 10/2010 | Hodjat et al. | 706/10 |
| 2010/0293119 A1 | 11/2010 | Ferringer et al. | 706/13 |
| 2011/0161264 A1 | 6/2011 | Cantin | |
| 2012/0239517 A1 | 9/2012 | Blondeau et al. | |
| 2013/0124440 A1 | 5/2013 | Hodjat et al. | 706/13 |
| 2013/0254142 A1 | 9/2013 | Hodjat et al. | |
| 2014/0006316 A1 | 1/2014 | Hodjat et al. | |
| 2015/0046181 A1 | 2/2015 | Adjaoute | |
| 2016/0350671 A1 | 12/2016 | Morris, II et al. | |
| 2017/0270225 A1 | 9/2017 | Chen et al. | |
| 2017/0293849 A1 | 10/2017 | Hodjat et al. | |

FOREIGN PATENT DOCUMENTS

| | | | |
|---|---|---|---|
| JP | 08-110804 | 4/1996 | G05B 19/05 |
| JP | 2001325041 | 11/2001 | G06F 1/00 |
| JP | 2003044665 | 2/2003 | G06F 17/60 |
| JP | 2004240671 | 8/2004 | G06F 15/177 |
| JP | 2004302741 | 10/2004 | G06F 15/16 |
| JP | 200752247 | 8/2007 | G06F 9/48 |
| JP | 2007207173 | 8/2007 | G06F 11/34 |
| WO | WO 2005/073854 | 8/2005 | G06F 9/50 |
| WO | WO 2010/127039 | 11/2010 | G06F 15/18 |
| WO | WO 2010/127042 | 11/2010 | G06F 15/173 |
| WO | WO 2019/217876 | 11/2019 | |

OTHER PUBLICATIONS

Sanchez, "Advocating the Use of Imprecisely Observed Data in Genetic Fuzzy Systems", IEEE, 2007 (Year: 2007).*

Ares "A soft computing framework for classifying time series based on fuzzy sets of events", 2015 (Year: 2015).*

Anooj, "Clinical decision support system: Risk level prediction of heart disease using weighted fuzzy rules", 2012 (Year: 2012).*

Ishibuchi, "Three-objective genetics-based machine learning for linguistic rule extraction", IEEE, 2005 (Year: 2005).*

Lahsasna, "Design of a Fuzzy-based Decision Support System for Coronary Heart Disease Diagnosis", (Year: 2012).*

Kwedlo, "Learning Decision Rules Using a Distributed Evolutionary Algorithm", 2002 (Year: 2002).*

Galea, "Iterative vs Simultaneous Fuzzy Rule Induction", IEEE, 2005 (Year: 2005).*

Hodjat, et al., "PRETSL: Distributed Probabilistic Rule Evolution for Time-Series Classification", Genetic Programming Theory and Practice Workshop (2016), 11 pages.

Alejandro Barredo Arrietz, et al., "Explainable Artificial Intelligence (XAI): Concepts, Taxonomies, Opportunities and Challenges Toward Responsible AI," https://arxiv.org/pdf/1910.10045.pdf, 2019.

European Parliamentary Research Service, "Understanding Algorithmic Decision-Making: Opportunities and Challenges," https://www.europarl.europa.eu/RegData/etudes/STUD/2019/624261/EPRS_STU(2019)624261_EN.pdf, 2019.

Blen M. Keneni, "Evolving Rule Based Explainable Artificial Intelligence for Decision Support System of Unmanned Aerial Vehicles," Evolving_Rule_Based_Explainable_Artificial_Intelli.pdf, 2018.

Riccardo Guidotti, et al., "A Survey of Methods for Explaining Black Box Models," https://dl.acm.org/doi/fullHtml/10.1145/3236009, 2018.

Ilya Loshchilov, "Surrogate-Assisted Evolutionary Algorithms," https://tel.archives-ouvertes.fr/tel-00823881/document, 2013.

Alan Diaz-Manriquez, et al., "A Review of Surrogate Assisted Multiobjective Evolutionary Algorithms," http://downloads.hindawi.com/journals/cin/2016/9420460.pdf, 2016.

Erwan Le Merrer, et al., "The Bouncer Problem: Challenges to Remote Explainability," https://arxiv.org/pdf/1910.01432.pdf, 2020.

Alain Chabrier, IBM, "Explaining Decision Optimization Prescriptions," https://medium.com/ibm-watson/explaining-decision-optimization-prescriptions-7103abbc44e5, 2019.

Zhiwei Zeng, et al., "Context-Based and Explainable Decision Making With Argumentation," http://ifaamas.org/Proceedings/aamas2018/opdfs/p1114.pdf, 2018.

Jakob Bossek, et al., "One-Shot Decision-Making With and Without Surrogates," https://arxiv.org/pdf/1912.08956v1.pdf, 2019.

Cynthia Rudin, "Stop Explaining Black Box Machine Learning Models for High Stakes Decision and Use Interpretable Models Instead," https://www.nature.com/articles/s42256-019-0048-x, 2019.

Maribel Lopez, "Preparing for AI Ethics and Explainability in 2020,"https://www.forbes.com/sites/maribellopez/2020/01/21/preparing-for-ai-ethics-and-explainability-in-2020/#15b37b022f6e, 2020.

Goodman, et al., "European Union (EU) regulations on algorithmic decision-making and a 'right to explanation,'" arXiv: 1606.08813v3, Aug. 2016.

Qiu, X. et al., "Quantifying Point-Prediction Uncertainty in Neural Networks via Residual Estimation with an I/O Kernel," In Proceedings of the Eighth International Conference on Learning Representations (ICLR) (2020).

Meyerson, E. et la., Discovering evolutionary stepping stones through behavior domination, In Proceedings of the Genetic and Evolutionary Computation Conference (GECCO 2017).

Miikkulainen, R. et al., Sentient ascend: AI-based massively multivariate conversion rate optimization, In Proceedings of the Thirtieth Innovative Applications of Artificial Intelligence Conference. AAAI (2018).

Miikkulainen et al., Ascend by Evolv: AI-Based Massively Multivariate Conversion Rate Optimization, AI Magazine (2020).

Johnson et al., "Flavor-Cyber-Agriculture: Optimization of plant metabolites in an open-source control environment through surrogate modeling," PLOS One (2019), https://doi.org/10.1371/journal.pone.0213918.

Stanley, K. et al, "Designing neural networks through neuroevolution," Nature Machine Intelligence, vol. 1, p. 24-35 (Jan. 2019).

Risto Miikkulainen, "Creative AI Through Evolutionary Computation," arXiv: 1901.03775v2, Feb. 22, 2020.

(56) References Cited

OTHER PUBLICATIONS

Diesenroth, M. and Rasmussen, C. E., "PILCO: A model-based and data-efficient approach to policy search," In Proceedings of the 28th International Conference on Machine Learning (ICML) (ICML '11), pp. 465-472, 2011.
Ha, D. and Schmidhuber, Jr., "Recurrent World Models Facilitate Policy Evolution," In Advances in Neural Information Processing Systems 32 (NIPS '18), Curran Associates, Inc., Red Hook, NY, USA, pp. 2455-2467, 2018.
Wahlström, N., Schön, T. B., and Deisenroth, M. P., "From pixels to torques: Policy learning with deep dynamical models," arXiv preprint arXiv: 1502.02251, 2015.
Mnih, V., Kavukcuoglu, K., Silver, D., Rusu, A. A., Veness, J., Bellemare, M. G., Graves, A., Riedmiller, M., Fidjeland, A. K., Ostrovski, G., and others, "Human-level control through deep reinforcement learning," Nature 518, 7540, pp. 529-533, 2015.
Hasselt, H. V., "Double Q-learning," In Advances in Neural Information Processing Systems 23, J. D. Lafferty, C. K. I. Williams, J. Shawe-Taylor, R. S. Zemel, and A. Culotta (Eds.), Curran Associates, Inc., pp. 2613-2621, 2010.
Wang, Z., Schaul, T., Hessel, M., Van Hasselt, H., Lanctot, M., and De Freitas, "Dueling Network Architectures for Deep Reinforcement Learning," In Proceedings of the 33rd International Conference on Machine Learning (ICML) (ICML '16), vol. 48, JMLR org., 1995-2003.
Mnih, V., Badia, A. P., Mirza, M., Graves, A., Lillicrap, T., Harley, T., Silver, D., and Kavukcuoglu, "Asynchronous methods for deep reinforcement learning," (ICML) (ICML '16), pp. 1928-1937, 2016.
Schulman, J., Wolski, F., Dhariwal, P., Radford, A., and Klimov, O., "Proximal Policy Optimization Algorithms," CoRR abs/1707. 06347, 2017.
Houthooft, R., Chen, Y., Isola, P., Stadie, B., Wolski, F., Ho, O. J., and Abbeel, P., "Evolved policy gradients," In Advances in Neural Information Processing Systems 31, Curran Associates, Inc., pp. 5400-5409, 2018.
Khadka, et al., "Evolution-Guided Policy Gradient in Reinforcement Learning," 32nd Conference on Neural Information Processing Systems, 2018.
Pourchot, et al., "CEM-RL: Combining Evolutionary and Gradient-Based Methods for Policy Search," ICLR, 2019.
Application as filed for U.S. Appl. No. 16/424,686, filed May 29, 2019.
Application as filed for U.S. Appl. No. 16/502,439, filed Jul. 3, 2019.
Application as filed for U.S. Appl. No. 16/879,934, filed May 21, 2020.
U.S. Appl. No. 13/358,381—Office Action dated Jul. 8, 2014, 30 pp.
Freitas, A., "A review of evolutionary algorithms for data mining," Soft Computing for Knowledge Discovery and Data Mining, Springer US, 2008, pp. 79-111.
U.S. Appl. No. 13/540,507—Office Action dated Sep. 9, 2014, 25 pp.
Hodjat, et al., "Chapter 5: Introducing an Age-Varying Fitness Estimation Function," Genetic Programming Theory and Practice X, Ed. Riolo, et al., Springer, Apr. 19, 2013, pp. 59-71.
Li, Xiaodong and Kirley, Michael, "The Effects of Varying Population Density in a Fine-Grained Parallel Genetic Algorithm," 2002, CEC'02, Proceedings of the 2002 Congress on Evolutionary Computation, vol. 2, IEEE, 2002.
Fidelis, Marcos Vinicius, Heitor S. Lopes, and Alex A. Freitas, "Discovering Comprehensible Classification Rules With a Genetic Algorithm," Proceedings of the 2000 Congress on Evolutionary Computation, vol. 1, IEEE, 2000.
International Search Report and Written Opinion for PCT Application No. PCT/US2008/82876, dated Dec. 23, 2008, 8 pp.
Koza, J. R., "Genetic Programming: On the Programming of Computers by Means of Natural Selection," Dec. 1992, MIT Press, pp. 1-609.
Extended European Search Report for EP Application No. EP 08847214, 9 pp.
Enee, Gilles, et al., "Classifier Systems Evolving Multi-Agent System With Distributed Elitism," Proceedings of the 1999 Congress on Evolutionary Computation (CEC'99), vol. 3:6, Jul. 1999, pp. 1740-1746.
Tanev, I., et al., "Scalable Architecture for Parallel Distributed Implementation of Genetic Programming on Network of Workstations," J. Systems Architecture, vol. 47, Jul. 2001, pp. 557-572.
Streichert, F., "Introduction to Evolutionary Algorithms," paper to be presented Apr. 4, 2002 at the Frankfurt MathFinance Workshop, Mar. 30, 2002, Frankfurt, Germany, XP55038571, 22 pp., Retrieved from the Internet: http://www.ra.cs.uni-tuebingen.de/mitarb/streiche/publications/Introduction_to_E_volutionary_Algorithms.pdf.
Written Opinion from Singapore Patent Office in related application SG 201003127-6, dated Jun. 16, 2011, 9 pp.
Exam Report for related application AU 2008323758, dated Apr. 20, 2012, 2 pp.
Sakauchi, et al., UNIFINE: A Next Generation Financial Solution System of Nihon Unisys Ltd., Technology Review 'Unisys,' Japan, Nihon Unisys Ltd., Feb. 28, 2006, vol. 25, No. 4, pp. 14-15.
Office Action from JP 2010-533295, dated Apr. 16, 2013, 12 pp.
Laumanns, Marco, et al., "A Unified Model for Multi-Objective Evolutionary Algorithms with Elitism," IEEE, pp. 46-53, 2000.
Ahn, Change Wook, et al., "Elitism-Based Compact Genetic Algorithms," IEEE, Transactions on Evolutionary Computation, vol. 7, No. 4, pp. 367-385, 2003.
Hornby, Gregory S., "The Age-Layered Population Structure (ALPS) Evolutionary Algorithm," ACM, GECCO '09, 7 pp., 2009.
Hornby, G. S., "ALPS: The Age-Layered Population Structure for Reducing the Problem of Premature Convergence," GECCO '06, Seattle, Jul. 2006, authored by an employee of the U.S. Government, therefore in the public domain, 8 pp.
Hornby, G. S. "A Steady-State Version of the Age-Layered Population Structure EA," Chapter 1 of Genetic Programming Theory and Practice VII, Riolo, et al., editors, Springer 2009, 16 pp.
Hornby, G. S., "Steady-State ALPS for Real-Valued Problems," GECCO '09, Montreal, Jul. 2009, Assoc. of Computing Machinery, 8 pp.
Idesign lab, "ALPS—The Age-Layered Population Structure," UC Santa Cruz web article printed Mar. 17, 2011, 3 pp. (http://idesign.ucsc.edu/projects/alps.html).
Gaspar-Cunha, A., et al., "A Multi-Objective Evolutionary Algorithm Using Neural Networks to Approximate Fitness Evaluations," Int'l. J. Computers, Systems and Signals, 6(1), pp. 18-36, 2005.
Kosorukoff, A., "Using Incremental Evaluation and Adaptive Choice of Operators in a Genetic Algorithm," Proc. Genetic and Evolutionary Computation Conference, GECCO, Sep. 2002, 7 pp.
Nelson, A., "Fitness Functions in Evolutionary Robotics: A Survey and Analysis," Robotics and Autonomous Systems 57, 2009, 345-370.
Wu, A. S., et al., "An Incremental Fitness Function for Partitioning Parallel Tasks," Proc. Genetic and Evolutionary Computation Conf., Aug. 2001, 8 pp.
Whitehead, B. A., "Genetic Evolution of Radial Basis Function Coverage Using Orthogonal Niches," IEEE Transactions on Neural Networks, 7:6, Nov. 1996, 1525-28.
Bui, L. T., et al., "Local Models: An Approach to Distributed Multi-Objective Optimization," Computational Optimization and Applications, vol. 42, No. 1, Oct. 2007, pp. 105-139.
Castillo, Tapia M. G., et al., "Applications of Multi-Objective Evolutionary Algorithms in Economics and Finance: A Survey," Proc. IEEE Congress on Evolutionary Computation, Sep. 2007, pp. 532-539.
Ducheyne, E., et al., "Is Fitness Inheritance Useful for Real-World Applications?," Evolutionary Multi-Criterion Optimization, ser. LNCS 2631, Spring 2003, pp. 31-42.
Gopalakrishnan, G., et al., "Optimal Sampling in a Noisy Genetic Algorithm for Risk-Based Remediation Design," Bridging the Gap: Meeting the World's Water and Environmental Resources Challenges, Proc. World Water Congress, 2001, 8 pp.
Juille, H., "Evolution of Non-Deterministic Incremental Algorithms as a New Approach for Search in State Spaces," Proc. 6th Int'l. Conf. on Genetic Algorithms, 1995 8 pp.
International Search Report dated Jul. 2, 2010 in PCT/US10/32847.

(56) References Cited

OTHER PUBLICATIONS

International Search Report dated Jun. 29, 2010 in PCT/US10/32841.
Sacks, J., et al., "Design and Analysis of Computer Experiments," Statistical Science, 4:4, 1989, 409-435.
Torresen, J., "A Dynamic Fitness Function Applied to Improve the Generalisation When Evolving a Signal Processing Hardware Architecture," Proc. EvoWorkshops, 2002, 267-299 (12 pp.).
Bartlett II, J. E., et al., "Organizational Research: Determining Appropriate Sample Size in Survey Research," IT, Learning, and Performance Journal, 19(1), Spring 2001, 8 pp.
Fitzpatrick, J. M., et al., "Genetic Algorithm in Noisy Environments," Machine Learning 3:101-120, May 1988.
Leon, C., et al., "Parallel Hypervolume-Guided Hyperheuristic for Adapting the Multi-Objective Evolutionary Island Model," Proc. $3^{rd}$ Int'l. Workshop on Nature Inspired Cooperative Strategies for Optimization Studies in Computational Intelligence, vol. 236, Nov. 2008, pp. 261-272.
Lopez, Jaimes A., et al., "MRMOGA: Parallel Evolutionary Multiobjective Optimization Using Multiple Resolutions," Proc. IEEE Congress on Evolutionary Computation, vol. 3, Sep. 2005, pp. 2294-2301.
Davarynejad, M., et al., "A Novel General Framework for Evolutionary Optimization: Adaptive Fuzzy Fitness Granulation," CEC, Sep. 2007, 6 pp.
Davarynejad, M., "Fuzzy Fitness Granulation in Evolutionary Algorithms for Complex Optimization," Master of Science Thesis, Ferdowsi Univ. of Mashhad, Jun. 2007, 30 pp.
Salami, M., et al., "A Fast Evaluation Strategy for Evolutionary Algorithms," Applied Soft Computing 2/3F (2003), 156-173.
M.-R. Akbarzadeh-T., et al., "Friendship Modeling for Cooperative Co-Evolutionary Fuzzy Systems: A Hybrid GA-GP Algorithm," Proc. $22^{nd}$ Int'l. Conf. of N. American FIPS, Jul. 2003, pp. 61-66.
Mouret, J. B., et al., "Encouraging Behavioral Diversity in Evolutionary Robotics: An Empirical Study," MIT, Evolutionary Computation, 20(1):91-133, 2012.
Myers, Raymond H. and Montgomery, Douglas C., "Response Surface Methodology: Process and Product Optimization Using Designed Experiments," John Wiley and Sons, Inc., New York, 1995.
Poli, R., et al., "Genetic Programming: An Introductory Tutorial and a Survey of Techniques and Applications," Univ. Essex School of Computer Science and Electronic Engineering Technical Report No. CES-475, Oct. 2007, 112 pp.
Georgilakis, P. S., "Genetic Algorithm Model for Profit Maximization of Generating Companies in Deregulated Electricity Markets," Applied Artificial Intelligence, Jul. 2009, 23:6, 538-552.
Refaeilzadeh, P., et al., "Cross Validation," entry, Encyclopedia of Database Systems, eds. Ozsu and Liu, Springer, 2009, 6 pp.
Remde, S., et al., "Evolution of Fitness Functions to Improve Heuristic Performance," LION, Dec. 8-10, 2007 II, LNCS 5313, pp. 206-219.
Schoreels, C., "Agent Based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.
Bongard, J. C., et al., "Guarding Against Premature Convergence While Accelerating Evolutionary Search," GECCO '10: Proceedings of the $12^{th}$ Annual Conference on Genetic and Evolutionary Computation, 8 pp. (2010).

\* cited by examiner

DISTRIBUTED RULE-BASED PROBABILISTIC TIME-SERIES CLASSIFIER

CROSS-REFERENCE TO OTHER APPLICATIONS

This application claims priority to U.S. Provisional Application 62/320,412, filed Apr. 8, 2016, entitled "DISTRIBUTED RULE-BASED PROBABILISTIC TIME-SERIES CLASSIFIER", which incorporated by reference herein.

The following patent is also incorporated by reference herein: U.S. Pat. No. 8,909,570, issued Dec. 9, 2014, entitled "DATA MINING TECHNIQUE WITH EXPERIENCE-LAYERED GENE POOL" (application Ser. No. 13/184,307, filed Jul. 15, 2011).

The following patent is also incorporated by reference herein: U.S. Pat. No. 9,466,023, issued Oct. 11, 2016, entitled "DATA MINING TECHNIQUE WITH FEDERATED EVOLUTIONARY COORDINATION" (application Ser. No. 14/011,062, filed Aug. 27, 2013).

BACKGROUND

The invention relates generally to data mining, and more particularly, to the use of genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments.

The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving ruleset is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, the rules of each individual are run over a common set of training data, and the performance of each individual is evaluated using the fitness function. Individuals with the highest fitness are then used to create the next generation in a process called procreation, and individuals with the lowest fitness may be removed from the candidate pool. Through procreation, rules of parent individuals are mixed, and sometimes mutated (i.e., a random change is made in a rule) to create a new ruleset. This new ruleset is then assigned to a child individual that will be a member of the new generation. In some incarnations, known as elitist methods, the fittest members of the previous generation, called elitists, are also preserved into the next generation.

Logic-based rulesets may determine which rules may contribute to the output of the individual based on satisfying the conditions of the rule. When a rule includes multiple conditions, each and every condition may need to be satisfied for the rule to fire, and only fired rules contribute to the individual's output. Thus a binary decision is made with respect to each condition. No partial credit is given for the data being close to satisfying a condition, and rules having conditions for which the data is very far away from satisfying the condition has no opportunity to contribute a lack of confidence for predicting membership in the class.

In addition, some decisions are not amenable to being made on the basis of hard thresholds generated by a ruleset.

SUMMARY

The approach described herein includes probabilistic extensions to rule-based logic. Fuzzy logic may be used to determine an indication of how close the input data is to satisfying the conditions rather than using a binary determination that the all the conditions are completely satisfied or none at all. In a probabilistic ruleset the consequences of rules are used to update a conditional probability statement. The probability output by the ruleset may be, for example, an answer to the question, "What's the probability of A occurring" where knowing the probability of A occurring (or the probability that A is the correct classification for the data) informs a decision about whether to take action in response to the predicted probability for A. For example, if A is that a patient has a particular disease, a probabilistic rule might be, "IF condition B is present THEN the probability of the patient having the particular disease is Z." If Z is a high probability, then a decision to treat the disease may be made. However, if the patient doesn't have the disease, then treating the disease may introduce unnecessary, possibly expensive treatment that may even be harmful to the patient. If Z is a low probability, then the decision may be made to not treat the patient for the disease. Providing a probability of the classification providers more accurate information that can be used by a human to make a decision based on the output of the ruleset.

The approach is illustrated using an example of a blood pressure prediction application, where the goal is to decide whether or not the patient will experience a blood pressure-related event in the near future. However, many different kinds of applications may benefit from this approach, such as other medical diagnoses or interventions, predicting/anticipating weather conditions, or predicting/anticipating an impending occurrence of a natural disaster. For example, a computer executed ruleset may be used to automatically provide input to a medical professional regarding whether treatment is needed given a set of symptoms and/or measured vital signs. Rather than having the ruleset prescribe a treatment directly, the ruleset provides a probability that a particular event will occur or that a particular state may be attributed to an entity from which the data was observed/collected. In a medical application, a medical professional can then decide, based on the probability output by the ruleset and any thresholds that have been empirically determined, whether or not to proceed with treatment. In a weather-related application, a meteorologist may decide whether to call for evacuation of an area. In another embodiment, in an application in which the thresholds are well understood, an automated system may replace an experienced human to make the decision using the probability output by the ruleset together with well-established thresholds.

To provide such functionality, the ruleset outputs a probability rather than an action. In the approach described herein, each rule in the ruleset includes a probability indicating the probability of membership in a predetermined class if the conditions of the rules are met. However, there may be more than one rule in the ruleset, each with its own conditions and corresponding probability. The probability provided as output on which a decision is to be made may be derived by considering the probabilities of all of the rules in the ruleset for which the input data provides values for the rule conditions.

In an embodiment, the ruleset is evolved using an evolutionary algorithm. But since the ruleset structure and use described above is different than logic-based rulesets portions of the evolutionary algorithm are modified to produce a ruleset that outputs an overall probability of an event happening. These modifications are described herein.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

Terminology As Used Herein

Classification: Classification is an abstraction that represents the state of a of entity about which data is recorded. Machine-learned rules are often trained to assign input data to one of a plurality of classifications. A classification may refer for example to an event occurring, or detecting that the entity about which data is collected is in a particular state. The classifications of interest to this disclosure are those to which a response may be expected. The decision of how to respond to the classification is aided by the output of the rules. A classification has a set of criteria that defines membership in the class. Membership in a class exists at a particular data point if the criteria for membership is satisfied at that data point. An example of a classification is an event that has occurred prior to the particular data point, is occurring at the data point, or will occur after the data point. Similarly, a classification may indicate a state of the entity about which the data is collected, and the state may be indicated before the particular data point, at the data point, or after the data point. Thus, the phrase "membership in a class" indicates that an event occurred or a state exists relative to a particular data point.

Rule-level probability: A probability assigned to a rule at the time the rule is created. The rule-level probability indicates the rule's prediction of the probability of membership in a predetermined class.

Condition: a condition is a Boolean expression that evaluates to 1 if true and 0 if false. The condition includes an indication of a feature input value from the input data, a relational operator, and a value against which to compare the feature. The feature input value includes which feature to use as well as an indication of which data point(s) to use from the input data. In time series data, the indication of which data point to use may indicate a time point relative to the then-current time point in the series.

Feature: a feature is an attribute that is useful for predicting membership in a class and for which data may be collected and input to the rules. For example, features used by a weather predicting application may include temperature, wind speed, humidity, barometric pressure, etc.

Condition-level certainty value: A value assigned to a particular rule condition that indicates the extent to which an input value satisfies a corresponding condition in a rule. Using Boolean logic, the Boolean condition-level certainty value is 0 or 1. Using fuzzy logic, the fuzzy condition-level certainty value may be a value such as a number between 0 and 1.

Rule-level certainty value: A value that indicates the extent to which all the rule's conditions are met by the input data. The rule-level certainty value is usually an aggregation of the condition-level certainty values assigned to the conditions in a rule. Using Boolean logic, the rule-level certainty value is 0 or 1. Using fuzzy logic, the rule-level certainty value may be a value such as a number between 0 and 1.

Probability output of the ruleset: A probability value output by an entire ruleset indicating the ruleset's view of the probability of membership in a predetermined class. This value may be determined as an aggregation of the probabilities assigned to the rules in the ruleset.

Training data samples: An ordered sequence of data points, each data point including values for features referenced in the rule conditions. A training data sample may comprise a sequence of data points collected/observed from a particular entity such as from a particular patient.

Data point: A single member of an order series of a training data sample or production data sequence that includes one or more measurements/observations providing feature input values.

Ruleset: one or more rules that together determine a probability of membership in a class.

Individual: A genome that identifies a ruleset, evolved from an evolutionary algorithm.

Condition relationship: A relationship between an input feature and a value as specified in a condition in a rule. The relationship may be expressed by a relationship operator such as equal to, less than, less than or equal to, greater than, greater than or equal to, and not equal to. In an embodiment, the only relationship operators that are available are less than ("<") and not less than ("!<").

Per-data-point fitness score: The fitness score assigned to an individual based on its performance on a single data point of a sample of training data.

Individual fitness score: An overall fitness score assigned to an individual based on its performance on all of the data points of all of the samples of training data that were applied during the training. The individual fitness score may be an aggregation of the per-data-point fitness scores resulting from applying the individual to each data point.

Fuzzy value: fuzzy logic uses values that can take on any of multiple values within a value range, rather than only one value that represents "true" and one value that represents "false". Typically a fuzzy value has a range of possible values, which is equal to the range from a value that indicates completely false (e.g., 0) to a value that indicates completely true (e.g., 1). The choices for fuzzy values may be continuous in some embodiments, or piecewise continuous in some embodiments, and in some embodiments it may not include all values between the completely false and the completely true value, so long as it includes at least one such value.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
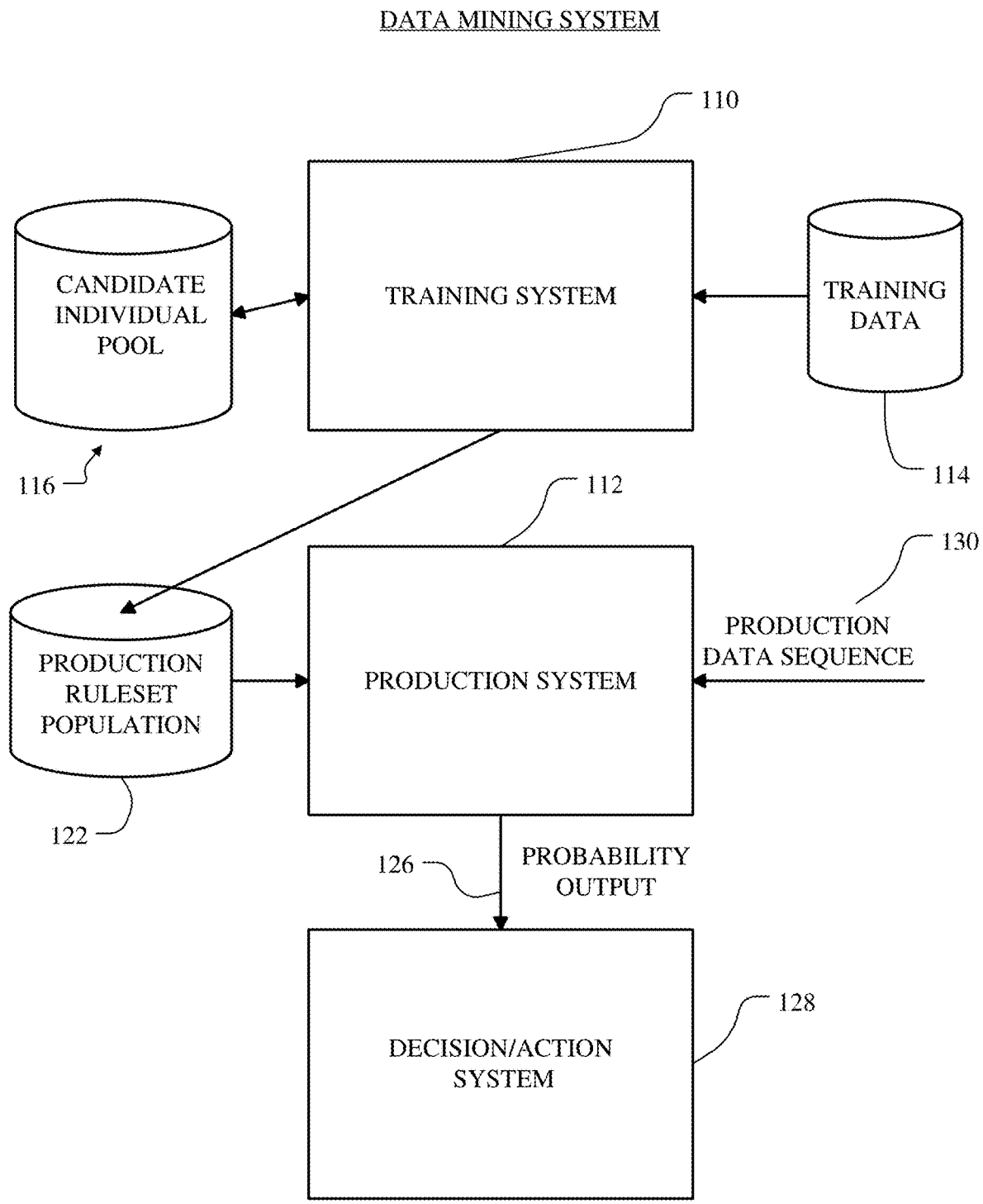
FIG. 1 is an overall diagram of an embodiment of a data mining system incorporating features of the invention.

FIG. 1 is an overall diagram of an embodiment of a data mining system incorporating features of the invention. The system is divided into three portions, a training system 110, a production system 112, and a decision/action system 128.

The production system 112 operates according to one or more production ruleset population 122. The production system 112 applies these rulesets to production data sequences 130 comprising an ordered series of a plurality of measured/observed feature values. In an embodiment, the ordered series may be ordered chronologically. "Time series" is used herein as an example of a ordered series of data. However, time sequence data is not the only kind of data on which a system according to the invention can operate. The fact that time sequence data is ordered may be intuitive, because successive data points naturally represent a time sequence of events. But data in other environments can be sequenced as well. For example, the list of nucleotide bases of a DNA strand are ordered sequences, as are the pixel values in an image to be classified (ordered in two dimensions). In general, any set of data in which the position of an element relative to other elements in the data set matters, can make use of aspects of the invention described herein.

Examples of features of a blood pressure monitoring application may include temperature, pulse, blood pressure, surgery duration, white blood count, oxygen level, type of medication administered, time since medication administered, etc., and the data observed/collected at a time point t may comprise the patient's temperature, pulse, and blood pressure, etc. When the one or more rulesets process this production input data, the ruleset as a whole outputs a probability 126 that a blood-pressure related event will occur in the near future. In a financial asset trading environment, for example, the production data sequence 130 may be a stream of real time stock prices and the output probability 126 may be the probability that a stock price will soon decrease.

In an embodiment, multiple rulesets having different sets of rules may be used and process the same input data, and output a probability independent of other rulesets. Having multiple rulesets output similar probabilities may raise the confidence in the accuracy of the probabilities. The example used herein is described with respect to a single ruleset used in production.

The decision/action system 128 is a system that uses the probability output 126 from the rulesets together with predetermined thresholds to decide what if any action to take. The decision/action system 128 may output a recommendation for a human to perform an action, or if the action is controllable by a computer, such as a financial system, the decision control system 128 may also perform the recommended action. For example, if the ruleset predicts a probability that exceeds a threshold that a stock price is likely to decline, the decision/action system 128 may automatically sell the stock.

Depending on the application environment, the decision/action system 128 may be a mechanical system such as engines, air-conditioners, refrigerators, electric motors, robots, milling equipment, construction equipment, or a manufacturing plant.

The decision/action system 128 may also be performed by a trained professional who may use the output probability as another input on which to base a professional opinion regarding how to react to the data received at the current time. Such a professional may use their experience to decide how to respond to the output probability rather than applying a predetermined threshold value. In addition, there may be more than two ways of responding to the probability, and multiple thresholds may be involved in deciding which of multiple actions to take.

The rulesets used in the production system may be created in any known way of creating rulesets, including manually crafting the rules based on expert knowledge. The rulesets may be automatically generated using machine learning. For example, the rulesets may be evolved using an evolutionary algorithm. The training system 110 is a system for evolving rulesets to be used in production system 112.

The training system 110 interacts with a database 114 containing training data, as well as with another database 116 containing a candidate pool of individuals to evolve. As used herein, the term "database" does not necessarily imply any unity of structure. For example, two or more separate databases, when considered together, still constitute a "database" as that term is used herein. In particular, though candidate individual population 116 may appear in FIG. 1 as a unitary structure, it may actually be spread over multiple storage units. The training system 110 operates according to a fitness function, which indicates to the training system 110 how to measure the fitness of an individual. The training system 110 optimizes for individuals that have the greatest fitness, however fitness is defined by the fitness function. Although this disclosure refers to highest fitness score as being assigned to the best and most fit individual, any representation of the fitness score may be used. That is, in an embodiment, a low value for the fitness score may represent a fitter individual than a high value. For simplicity, therefore, a better fitness score is sometimes referred to herein as a higher fitness score, even if in a particular embodiment the better fitness score actually may be numerically lower. The fitness function is specific to the environment and goals of the particular application. For example, the fitness function may be a function of the predictive value of the individual as assessed against the training data. The training data comprises historical ordered samples of feature values corresponding to an output representing a classification of the consequences of the data. The more often the individual correctly predicts the consequence leading to a correct classification represented in the training data, the more fit the individual is considered to be.

The rulesets of one or more individuals having the best fitness score at the end of the training session are added to the production ruleset population 122 where they are used to process live data sequences 130. Their probability outputs are used for production purposes. In some embodiments, fitness score is no longer needed once an individual is moved into production.

Production System

Figure 2:
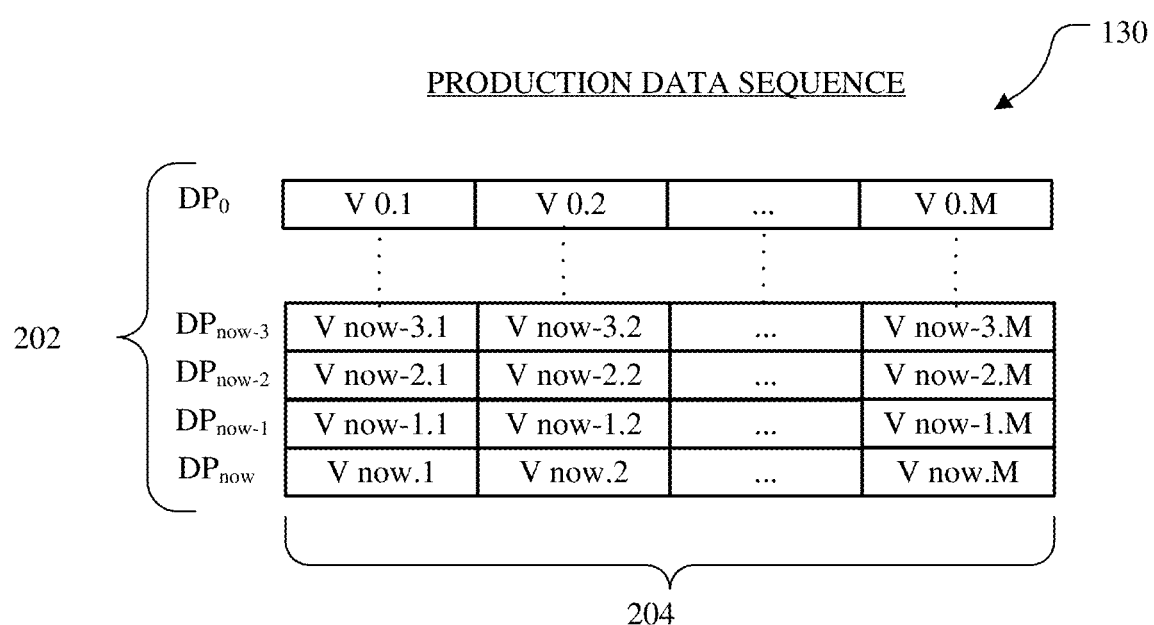
FIG. 2 is a symbolic drawing of a production data sequence in FIG. 1.

FIG. 2 is a symbolic drawing of a production data sequence 130. The production data sequence 130 is an ordered series of data points DP 202 indexed (or listed or graphed) in order. An example of an ordered series is a time series, a sequence taken at successive points in time. In an embodiment, the successive points in time may be periodic (equally spaced). Data in other environments can be sequenced as well. For example, the list of nucleotide bases of a DNA strand are ordered sequences, and the pixel values in an image, ordered in two dimensions. The production data sequence 130 is an ordered series of feature values 204. In this embodiment, the production data sequence 130 is a "time-series" data sequence from a blood pressure monitoring application and the new data point in the production data sequence 130 is the patient's latest recorded temperature, pulse, blood pressure, white blood count, oxygen level, etc. Data points 202 before $DP_{now}$ are previously recorded feature values.

Figure 3:
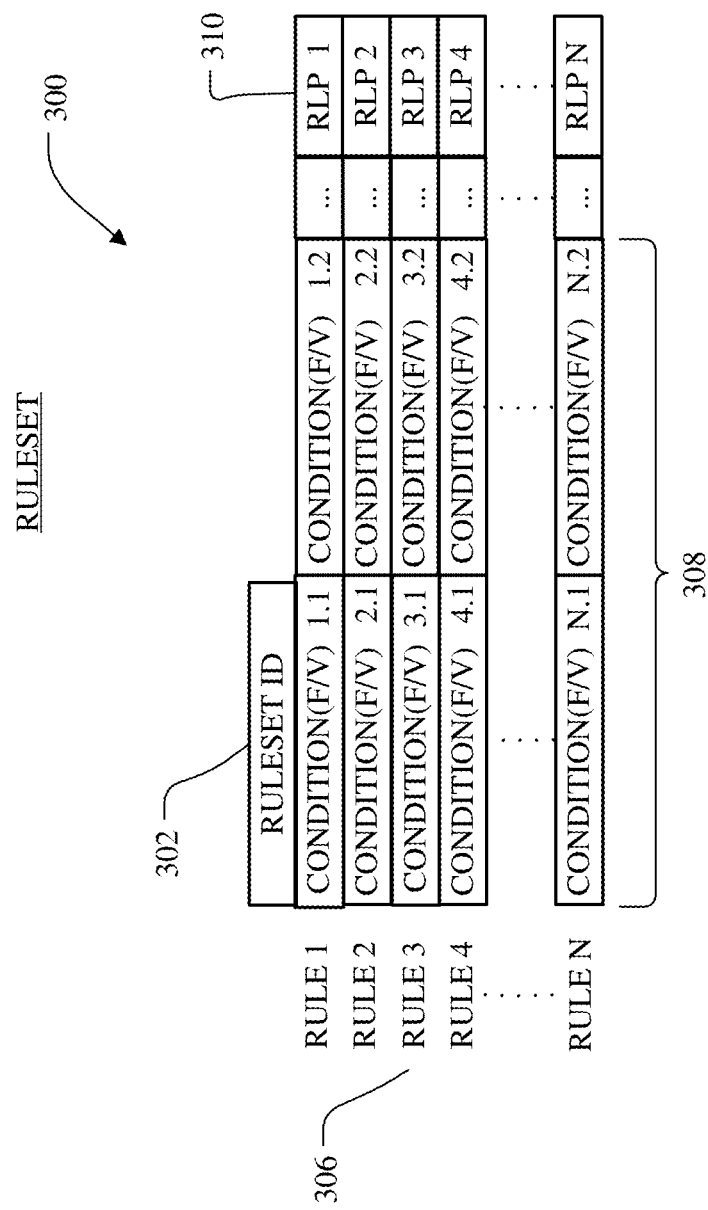
FIG. 3 is a symbolic drawing of a ruleset in the production population of rulesets in FIG. 1.

FIG. 3 is a symbolic drawing of a ruleset 300 in production ruleset population 122. In this embodiment, the ruleset identifies an ID 302.

A ruleset 300 is composed of one or more rules 306. Each rule 306 contains one or more conditions 308 and a rule-level probability (RLP) 310. The rule-level probability 310 indicates the probability that membership in the class exists when the conditions of this rule are satisfied. In an embodiment, the rule-level probability is one of set of enumerated (discrete) probability values, such as 0.1, 0.2, 0.3 . . . 1.0. In other embodiments the rule-level probability can be any value in a predetermined range of values.

A rule 306 is a conjunctive list of one or more conditions 308. Each rule in the ruleset may have a different number of conditions. A condition specifies a relationship between a particular feature value in the input data and a value in the condition. For example, (pulse(t-1)<90) is a condition that is satisfied when the pulse value in the previous data point (i.e. t-1) is less than 90. Pulse is the feature name, t-1 identifies a data point within the current sample from which to use the pulse measurement, 90 is the value to compare the input data against, and less than is the relationship. More than one condition in a rule may specify a relationship with an input value of the same feature.

In the embodiment of FIG. 3, the ruleset's conditions 308 are all specified as feature/value ("F/V") pairs. Another embodiment can also include conditions which are themselves conditioned on other items (such as other conditions in the rule or in a different rule or the result of another entire one of the rules). Yet another embodiment can also include conditions or rules which are specified procedurally rather than as F/V pairs. Many other variations will be apparent.

The extent to which a feature input value satisfies a condition 308 is referred to herein as a condition-level certainty value. In one embodiment, the system allows for applying binary logic to the evaluation of features and conditions. When using binary logic, if the specified feature satisfies the condition, condition-level certainty value is 1. If the specified feature does not satisfy the condition, condition-level certainty value is 0.

In one embodiment, if the feature value referenced in the condition is not available in the input data, the condition-level certainty value is 0.

In one embodiment, fuzzy logic is used to determine the condition certainty values. Fuzzy logic is a form of many-valued logic in which the truth values of variables may be any real number within a predetermined range, such as the range of 0 to 1 (e.g. 0.1, 0.2. 0.3, etc.) instead of being constrained to values of the integer values 0 or 1. The extent to which the input feature value satisfies the condition can be estimated by applying a sigmoid function on the relationship. The closer the input feature value is to satisfying the condition, the higher the condition certainty value, indicating the extent to which the input data satisfies the condition. For example, if the condition is pulse <90, a pulse of 91 does not satisfy the condition, but it is closer to 90 than a pulse of 120. Thus, when the input data indicates a pulse of 91, the condition certainty value is higher (more certain) than the condition certainty value when the pulse is 120.

The condition-level certainty values for input data applied to a rule 306 are aggregated to determine the rule-level certainty value. In one embodiment, the certainty aggregation function can be an average of the all the condition-level certainty values. For example, if the condition-level certainty values for three conditions are 0.2, 0.4, and 0.6 respectively, the rule-level certainty value may be 0.4. In one embodiment, the rule-level certainty value will be the minimum value of the condition-level certainty value (0.2 in the above example). In another embodiment, the rule-level certainty value will be the maximum value of the condition-level certainty value (0.6 in the above example).

In a healthcare embodiment, a ruleset can be thought of as a set of rules predicting a patient's future state, given the patient's current and past state. In an embodiment, the set of rules may classify a patient's current state based on current and past state. The rule-level certainty value of the rule can be an estimated probability of membership in the class. The features on which the rules are based can be a patient's vital signs, and past treatment and medication history, for example. An example rule is as follows:
condition 1.1: pulse[t]>=120
condition 1.2: blood pressure[t-1]>=120
condition 1.3: blood pressure[t-6]<90
RLP 1: high blood pressure related event 0.65
If condition 1.1 and condition 1.2 and condition 1.3, then RLP 1.

Figure 4:
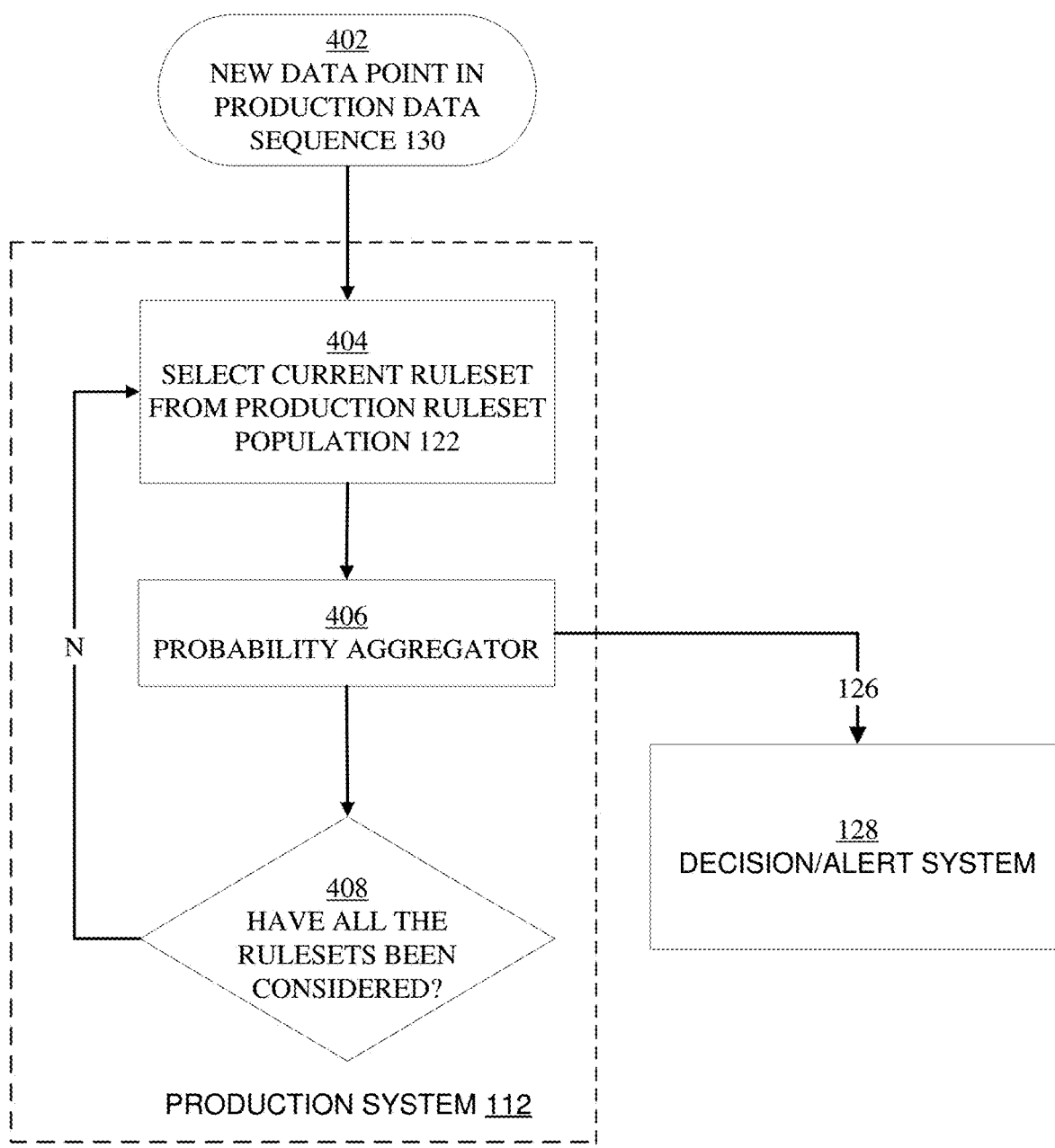
FIG. 4 illustrates a method of operation of the production system in FIG. 1.

FIG. 4 illustrates a method of operation of the production system 112. The production system 112 operates according to one or more rulesets 300 from the production ruleset population 122. The production system 112 applies these rulesets 300 to production data sequences 130 comprising of an ordered series 202 of a plurality of measured/observed feature values 204. When an ruleset 300 in the production ruleset population database 122 processes the production data sequence 130, the ruleset as a whole outputs a probability 126 for an event that can occur in the near future. In the case of the blood pressure monitoring application, the probability output 126 will indicate the possibility of a high blood pressure related event occurring in the near future.

In an embodiment, multiple rulesets 300 having different sets of rules 306 may be used to process the same input data, and output a probability 126 independent of other individuals. Having multiple rulesets 300 output similar probabilities may raise the confidence in the accuracy of the probabilities. In an embodiment, a single ruleset 300 may be used to process the production data sequence 130.

The decision/action system 128 is a system that uses the probability output 126 from the rulesets together with pre-determined threshold values to decide what if any action to take. In an embodiment, the decision/action system 128 may output a recommendation for a human to perform an action. For example, if the ruleset predicts a probability higher than a predetermined threshold value, for example 50%, that a patient's blood pressure will exceed the normal range in the near future, the decision/action system 128 may alert a nurse or a doctor. In an embodiment, the decision/action system 128 may also recommend an action. For example, if the ruleset predicts a probability that a patient's blood pressure will exceed the normal range in the near future with a probability greater than the threshold probability of 50%, the decision/action system 128 may recommend administering a blood pressure lowering drug.

Referring to FIG. 4, the production system 112 determines the probability output 126 for each data point in the production data sequence 130 with the aid of the rulesets 300 in the production ruleset population 122. The probability output 126 is determined in dependence upon the rule-level certainty values and the rule-level probabilities 310 of the rules 306 in the ruleset 300.

Referring to FIG. 4, the production system 112 begins the process of determining a probability output 126 when a new data point is received in the production data sequence 130 in block 402. In an embodiment, only one ruleset 300 is used in production, and the production data is processed by that one ruleset by the probability aggregator 406. In another embodiment, more than one ruleset may be used in production, so that the decision/action system 128 may receive multiple outputs for each new data point. A current ruleset 300 is then selected (block 404) from the production ruleset population 122. An initial ruleset 300 may be selected by user input, determined based on the structure, chosen at random, etc. Subsequent initial ruleset 300 may be selected incrementally, by user input, randomly, etc.

A probability aggregator 406 then determines the probability output of an individual for a given production data sequence 130 with the new data point. In an embodiment in which only one ruleset is used in production, blocks 404 and 408 can be omitted.

The probability output of the ruleset for the new data point in the production data sequence 130 and the current selected ruleset 300 is then reported to the decision/alert system 128.

If all the rulesets 300 in the production ruleset population 122 have been considered, the process in the production system 112 moves on to the next new data point (block 402). If not, a new ruleset 300 from the production ruleset population 122 is selected and applied to the current data point (block 408) before moving on to the next data point.

Probability Aggregator

Figure 5:
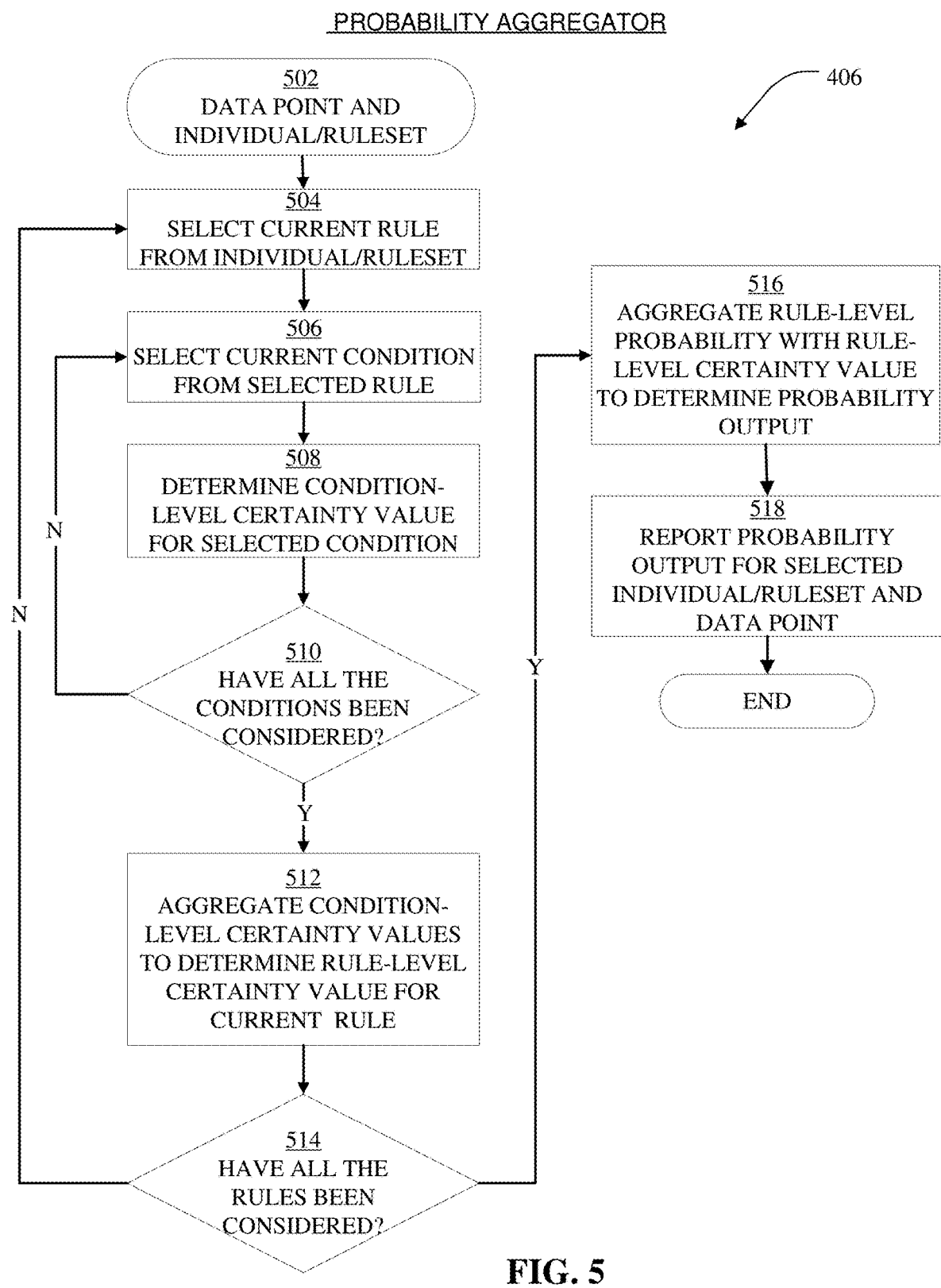
FIG. 5 is a method of operation of a probability aggregator in either the training system or the production system of in FIG. 1.

FIG. 5 is a method of operation of a probability aggregator 406 in either the training system 110 r the production system 112. As with all flow charts herein, the logic of FIG. 5 can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart describes logic that can be implemented in hardware or in software running on one or more computing processes executing on one or more computer systems. In one embodiment, each step of the flow chart illustrates the function of a separate module of software. In another embodiment, the logic of the step is performed by software code routines which are distributed throughout more than one module. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that in a specific embodiment, numerous additional steps for accomplishing other functions for that embodiment can be performed before, after and between those steps shown.

Referring to FIG. 5, a probability aggregator 406 determines the probability output of an individual or a ruleset for a given data point in an ordered series such as the production data sequence 130. The probability output is determined in dependence upon the rule-level certainty values and the rule-level probabilities of the rules in the individual or the ruleset. Each of the rules has one or more conditions, and some rules have a plurality of conditions. Condition-level certainty values are determined for each of the conditions of each of the rules. The condition-level certainty values for a rule having a plurality of conditions are aggregated to determine the rule-level certainty value.

Different embodiments of probability aggregator 406 can implement different aggregation algorithms. Referring to FIG. 5, a probability aggregator method 406 begins by receiving a data point from an ordered series (block 502) of feature values. The ordered series may be from a data sample from the training data 114 or production data sequence 130. An individual or a ruleset is also received in block 402 providing one or more rules, each of the rules having one or more conditions and an indication of a rule-level probability of membership in a predetermined class.

A current rule is then selected (block 504) from the individual/ruleset. An initial rule may be selected by user input, determined based on the structure, chosen at random, etc. without affecting the probability output of the ruleset or individual. Subsequent current rules may be selected incrementally, by user input, randomly, etc.

A current condition is then selected (block 506) from the selected rule. An initial condition may be selected by user input, determined based on the structure, chosen at random, etc. Subsequent current conditions may be selected incrementally, by user input, randomly, etc. The order in which the rule conditions are processed may not affect the rule's probability output for the input data.

A condition-level certainty value is determined for the current condition (block 508). When condition-level certainty values have been determined for all conditions (decision block 510), a rule-level certainty value for the selected rule is determined in dependence upon the condition-level certainty values of the conditions of the given rule (block 512). If there are more conditions not yet evaluated, a new current condition from the current rule is selected for evaluation (block 506).

Whether rule-level certainty values have been considered for all rules in the individual is determined (decision block 514). If not, a new current rule from the individual is selected (block 504).

If rule-level certainty values have been determined for all rules in the individual/ruleset, an individual probability output is determined in dependence upon the rule-level certainty value and the rule-level probability (block 516). The probability output is then reported for the selected individual and sequence in block 518 and the probability aggregator 406 ends.

In an embodiment, the probability output for an individual/ruleset is computed as the weighted sum over the product of the rule-level certainty value for rule r ($RLCV_r$) and the rule-level probability for rule r ($RLP_r$) of all the rules r in the individual/ruleset:

$$\text{probability output} = \frac{\sum_r (RLCV_r \cdot RLP_r)}{\sum_r RLCV_r}$$

In one embodiment, the probability output can be a function of the rule-level certainty values and the rule-level probabilities.

Training System

Figure 6:
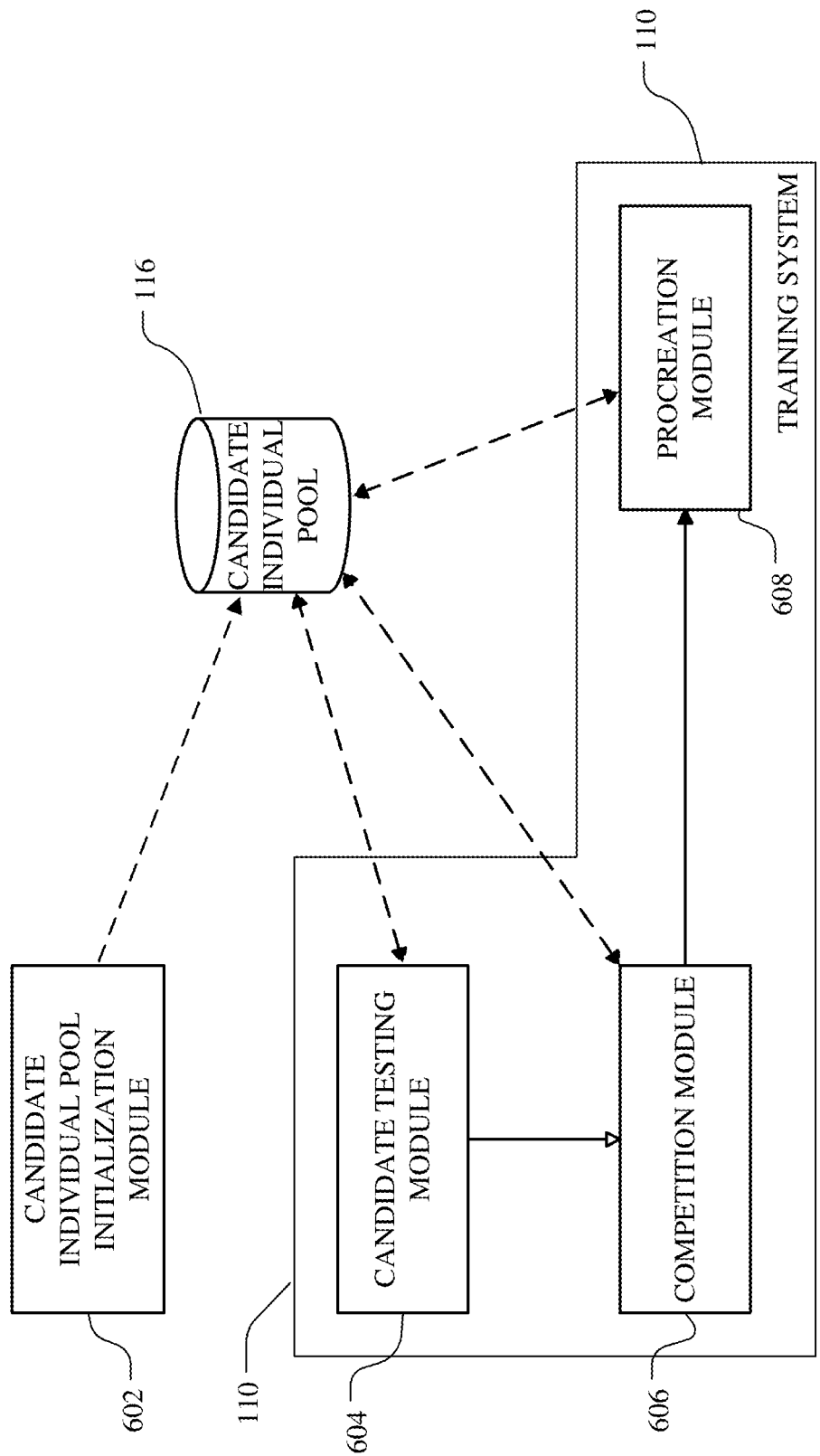
FIG. 6 illustrates various modules that can be used to implement the functionality of the training system in FIG. 1.

FIG. 6 illustrates various modules that can be used to implement the functionality of the training system 110. The candidate individual pool 116 is also shown in the drawing. Generally, solid lines indicate process flow, and broken lines indicate data flow. The modules can be implemented in hardware or software, and need not be divided up in precisely the same blocks as shown in FIG. 6. Some can also be implemented on different processor cores or computers, or spread among a number of different processors or computers. In addition, it will be appreciated that some of the modules can be combined, operated in parallel or in a different sequence than that shown in FIG. 6 without affecting the functions achieved. Also as used herein, the term "module" can include "sub-modules", which themselves can be considered herein to constitute modules. In particular, the candidate testing module 604, competition module 606, and procreation module 608 are also considered herein to be sub-modules of a training system 110. The blocks in FIG. 6 designated as modules can also be thought of as flowchart steps in a method.

Referring to FIG. 6, the candidate pool 116 is initialized by candidate individual pool initialization module 602, which creates an initial set of candidate individuals in the candidate individual pool 116. These individuals can be created randomly, or by some other algorithm, or in some embodiments a priori knowledge is used to seed the first generation. Each individual includes one or more rules, each with one or more conditions. Each rule also includes a rule-level probability, which can also be selected randomly from an enumerated set of probability choices. In another embodiment, individuals from prior runs can be borrowed to seed a new run. At the start, all individuals are initialized with a fitness estimate that is undefined.

Candidate testing module 604 next proceeds to test the population in the candidate individual pool 116 on the training data 114. Candidate testing module 604 tests all of the individuals in the local candidate individual population 116. Each individual undergoes a battery of tests or trials on the training data 114, each trial testing the individual on one sample. In one embodiment, each battery might consist of only a single trial. Preferably, however, a battery of tests is much larger, for example on the order of 1000 trials. Note there is no requirement that all individuals undergo the same number of trials. After the tests, candidate testing module 604 updates the local fitness estimate associated with each of the individuals tested.

Next, competition module 606 updates the candidate individual pool 116 contents in dependence upon the updated fitness estimates. The competition module 606 ranks the individuals in the candidate individual pool 116 by their fitness score.

After the candidate individual pool 116 has been updated, a procreation module 608 evolves a random subset of them. Only individuals in the candidate individual pool with high fitness scores are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with a fitness estimate that is undefined. These individuals are placed in candidate individual pool 116. Preferably, after new individuals are created by combination and/or mutation, the parent individuals are retained. In this case the parent individuals also retain their experience level and fitness estimates, and remain in their then-current local elitist pool layers. In another embodiment, the parent individuals are discarded.

After procreation, candidate testing module 604 operates again on the updated candidate individual pool 116. The process continues repeatedly.

The individuals having the best fitness score at the end of the training session are added to the production ruleset population 122 where they are used to process live production data sequences 130. Their probability outputs are used for production purposes. The fitness score is no longer needed once an individual is moved into production, and in some embodiments the fitness score may be deleted.

Figure 7:
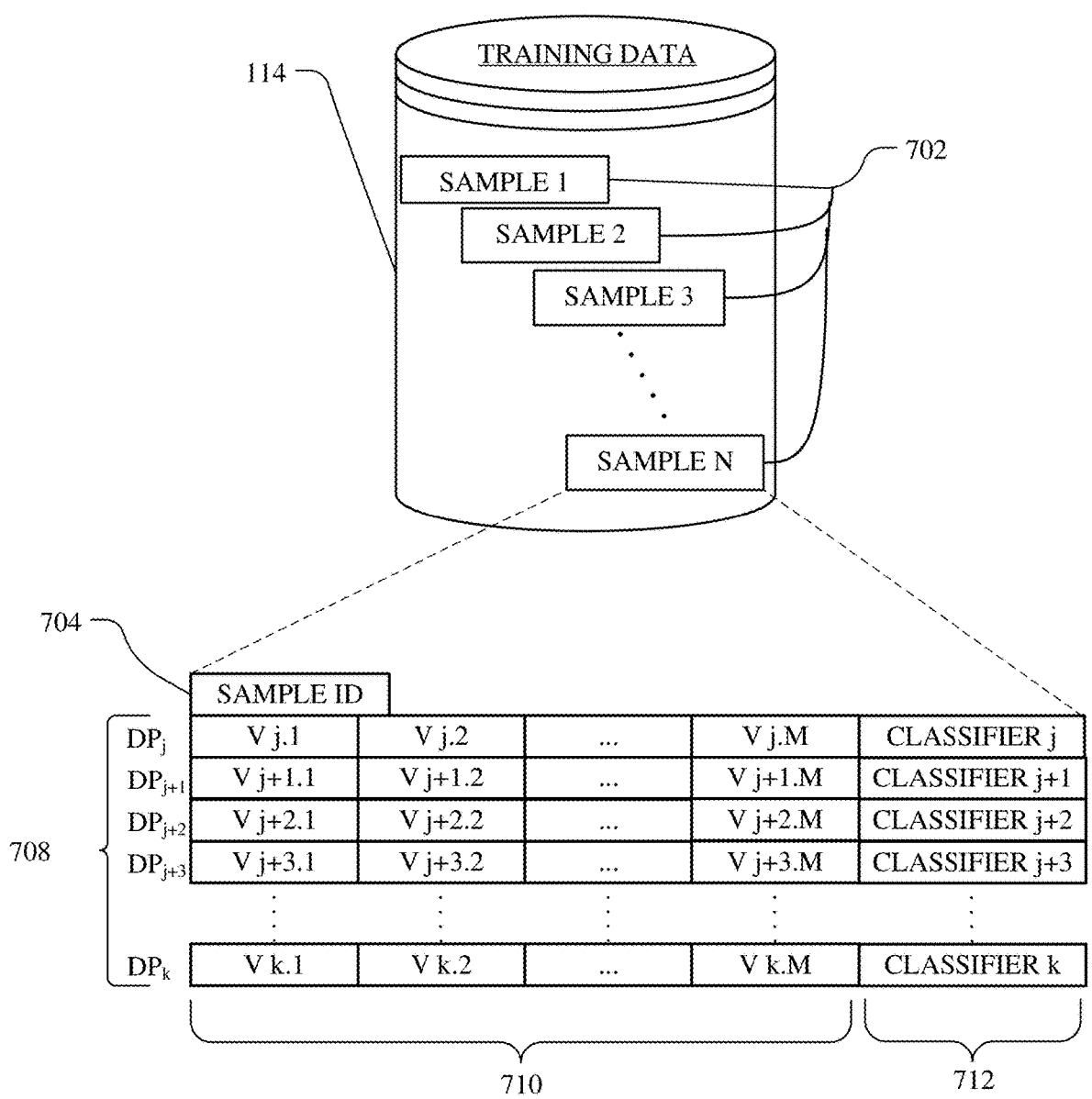
FIG. 7 is a symbolic drawing indicating how training data can be organized in the training database in FIG. 1.

FIG. 7 is a symbolic drawing indicating how training data may be organized in the training database 114. The training data may be historical data and may be organized in a manner similar to the production data. One difference between training and production data is that each data point in the training data includes an indication of membership in a class that may be used to evaluate the accuracy of a ruleset's prediction. Additionally, though training data 114 may appear in FIG. 1 and FIG. 6 as a unitary structure, in federated embodiments the data may be spread over multiple storage units. The training data is arranged in the database 114 as a set of samples 702. The data points 708 within a sample may be collected/observed from a common entity. For example, sample 1 may be vital signs recorded over time from one patient and sample 2 may be vital signs recorded over time from a different patient. In this embodiment, the samples 702 each includes an ordered series of data points 708 with sample ID 704. An ordered sequence is a series of data points DP 708 indexed (or listed or graphed) in order. The starting data point index in the figure is j and the data point index is increased by 1 for the next data point in the ordered series. The last data point index in the sample 702 is k. The value for index k is higher than the value for index j. An example of an ordered series is a time series, a sequence taken at successive equally spaced points in time. Thus it is a sequence of discrete-time data. Examples of time series data points are high resolution physiological waveforms recorded in the ICU or via the remote monitoring systems.

Data in other environments can be sequenced as well. For example, the list of nucleotide bases of a DNA strand are ordered sequences, and the pixel values in an image, ordered in two dimensions.

The sample 702 records an ordered series of feature values 710. Within a data point as illustrated in sample 702, the feature values appears in a fixed order such that a value corresponds to a feature based on its position within the data point. For example, Vj.1 represents the value of a first feature recorded for time j, and Vk.m represents the value of the m'th feature recorded for time k. In an embodiment, a data point might include feature attribute/value pairs in which the feature name is present for each value in the data point. The feature input values specified in each condition of each rule are expected to be present in the input data, though in some cases, a specified feature input values may be missing.

The predetermined classifier 712 indicates whether the data point was a member of the class. The predetermined classifier 712 is sometimes referred to herein as the "outcome" associated with the data point. In the illustration, classifier j represents an indication of class membership at time point j. The predetermined classifier 712 may be used to determine a per-data-point fitness score for individual based on the probability output of the individual for the data point. For example, in a blood pressure prediction application, a patient's temperature, pulse, blood pressure, surgery duration, white blood count, oxygen level, etc., may be recorded for a time point t. When one or more individuals process this production input data, each of the individuals as a whole outputs a probability that a blood-pressure related event will occur in the near future. The predetermined classifier 712 indicates whether a blood-pressure event occurred shortly after time t.

Figure 8:
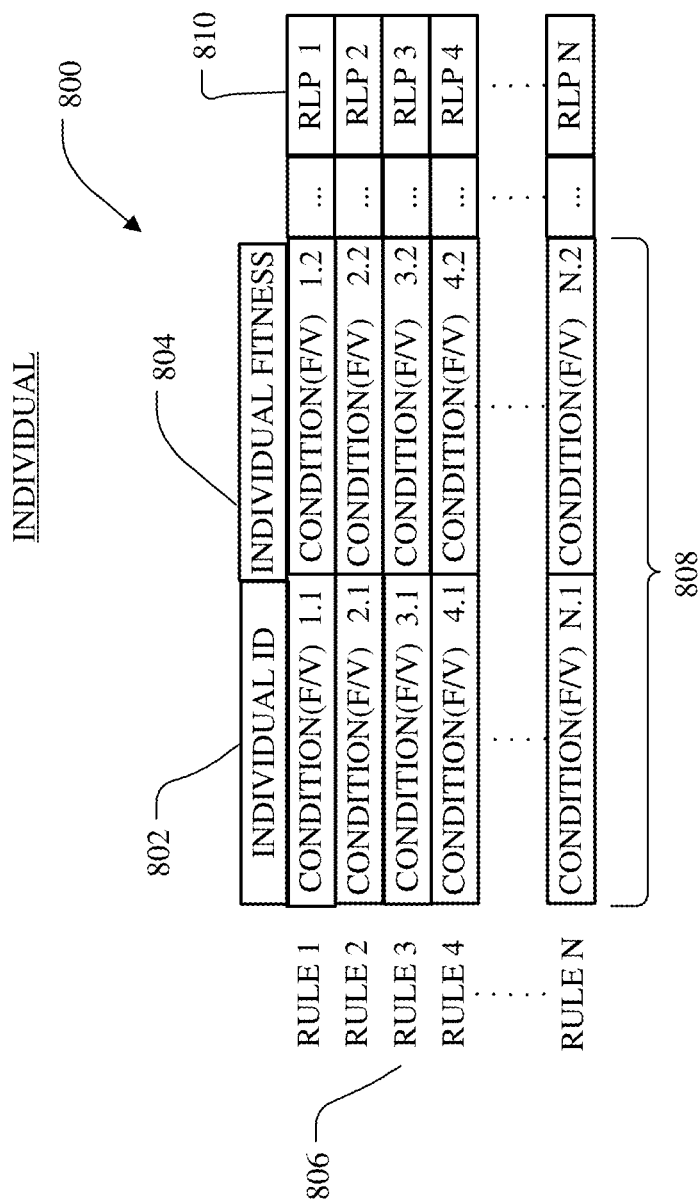
FIG. 8 is a symbolic drawing of an individual in either the candidate pool of individuals in FIG. 1.

FIG. 8 is a symbolic drawing of an individual 800 in the candidate individual pool 116. As used herein, an "individual" is defined by its contents, meaning two individuals are considered herein to be different if their contents differ in at least one aspect. An individual created by procreation is considered herein to constitute a different individual than its parents, even though it retains some of its parents' genetic material. In this embodiment, the individual identifies an ID 802 and its current individual fitness estimate 804.

An individual 800 is composed of one or more rules 806. When an individual is selected for use in production, the one or more rules 806 in the individual comprise the ruleset that is placed in the production ruleset population. In an embodiment, the structure of the rules in an individual's ruleset is the same as the structure of the rules in the production ruleset described above; thus, each rule 806 contains one or more conditions 808 and a rule-level probability 810. A rule-level probability 810 is assigned to a rule at the time when the individual is created and is subject to evolution. The rule-level probability 810 indicates that the probability of class membership when the conditions of this rule are satisfied. A rule-level probability 810 may be selected by user input, chosen at random, etc. In an embodiment, the rule-level probability is one of set of enumerated probability values, such as 0.1, 0.2, 0.3 . . . 0.9.

During procreation, any of the conditions 308 or the rule-level probability 810 may be altered, or even entire rules may be replaced. The individual's fitness estimate 804 is determined by the candidate testing module 604 in the training system 112, accrued over the all the trials.

Figure 9:
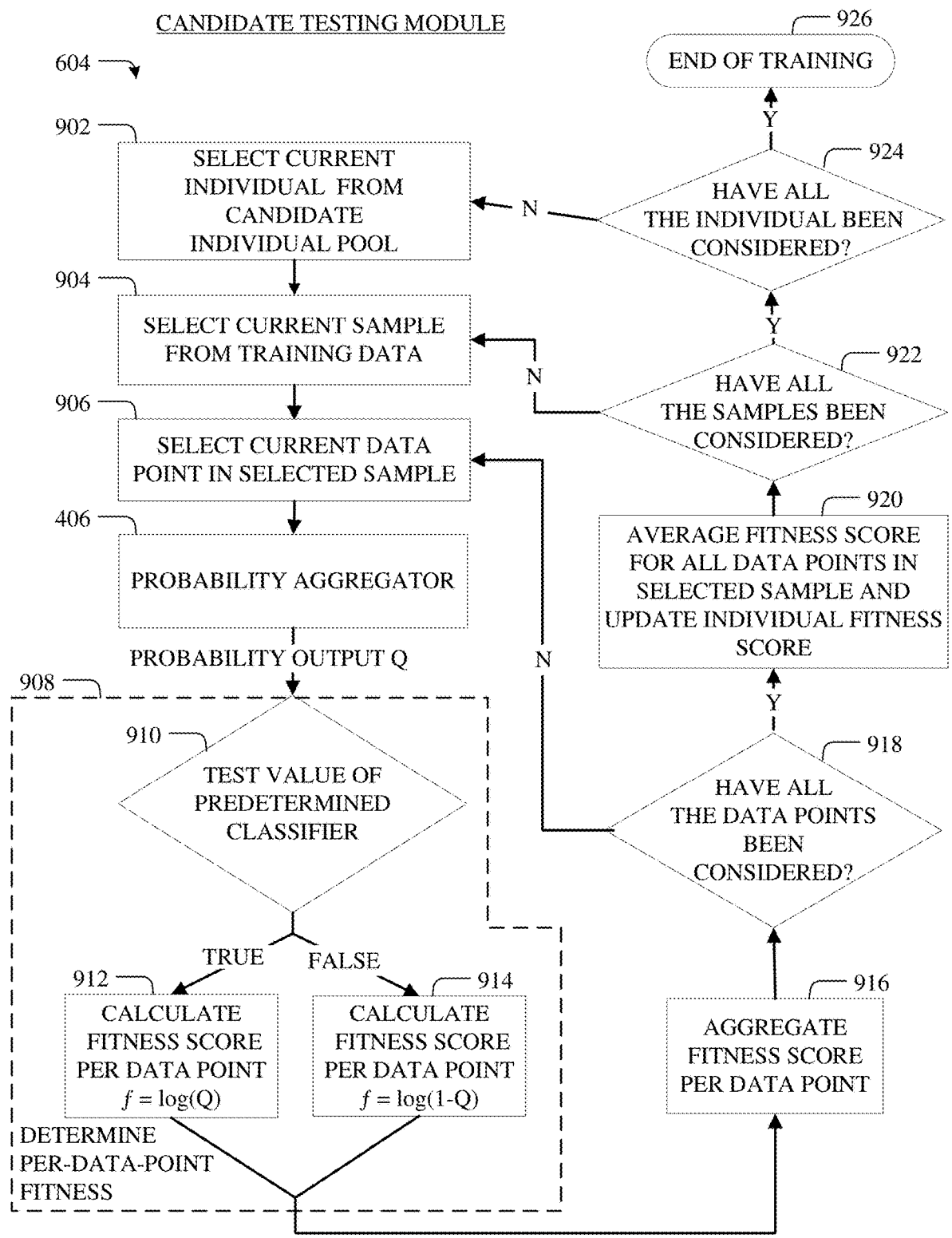
FIG. 9 illustrates a method of operation of the candidate testing module in FIG. 6.

FIG. 9 illustrates a method of operation of the candidate testing module 604 in the training system 110. Candidate testing module 604 rigorously tests the individuals in the candidate individual pool 116 on the training data 114. In this embodiment, candidate testing module 604 tests all of the individuals in the local candidate individual population 116 on every data point 708 of every sample 702 in the training data 114. Each individual undergoes a battery of tests or trials on the training data 114, each trial testing the individual on one sample 702. In one embodiment, each battery might consist of only a single trial. Preferably, however, a battery of tests is much larger, for example on the order of 1000 trials. Note there is no requirement that all individuals undergo the same number of trials. After the tests, candidate testing module 604 updates the local fitness estimate associated with each of the individuals tested in the candidate individual pool 116.

The candidate testing module starts the testing by selecting a current individual 800 (block 902) from the candidate individual population 116. An individual 800 may be selected by user input, determined based on the structure, chosen at random, etc. A subsequent current individual may be selected incrementally, by user input, randomly, etc.

A current sample 702 is then selected (block 904) from the training data database 114. An initial sample 702 may be selected by user input, determined based on the structure, chosen at random, etc. A subsequent current sample 702 may be selected incrementally, by user input, randomly, etc.

A current data point 708 is then selected (block 906) from the selected sample 702. An initial data point 708 may be selected by user input, determined based on the structure, chosen at random, etc. A subsequent current data point 708 is selected incrementally.

In block 406, the probability aggregator determines the probability output Q of the selected individual 800 for the selected data point 708 in the selected sample 702.

In block 908, the probability output Q is compared to the predetermined classifier 712 for the selected data point 708 to assign a fitness score for the current data point. The per-data-point fitness of the individual is determined in a manner such that the more that the probability output Q agrees with the outcome identified by the data point, the better the per-data-point fitness score will be for that data point. In one embodiment, this can be accomplished by determining the per-data-point fitness as a monotonically decreasing function of the absolute value of difference between the probability output of the given individual and the outcome identified by the given data point. In another embodiment, it can be accomplished by applying two different functions depending on the outcome identified by the data point. Other ways of accomplishing it will be apparent to the reader.

FIG. 9 illustrates a detail for block 908 for an embodiment in which two different functions are used. In block 910, if the predetermined classifier 712 for the selected data point 708 in the selected sample 702 is true, the fitness score for the current data point 708 may be calculated in block 912 by a first function; for example, log(Q).

In block 910, if the predetermined classifier 712 for the selected data point 708 in the selected sample 702 is false, the fitness score per data point 708 may be calculated in block 914 by a second function different from the first function; for example, log(1-Q).

Other functions can be used in different embodiments. In one embodiment, for example, the first and second function can be the mean squared error between the probability output Q and the predetermined classifier 712. In another embodiment, the first and second function can be the absolute error between the probability output Q and the predetermined classifier 712. Other possible functions will be apparent to the reader.

The fitness score per data point for every data point 708 in the sample 702 is aggregated in block 916.

If all the data points 708 have been tested in the selected sample 702 (block 918), the fitness score aggregated in block 916 is averaged over all data points in block 920. The fitness of the selected individual 800 is updated in the candidate individual pool 116 with the average fitness score over all data points determined in block 916. The process then proceeds to block 922. If all the data points have not been considered, the next data point 708 is selected from the selected sample 702 (block 906).

In block 922, if all the samples 702 in the training data database 114 have been tested, a new current individual 800 is chosen from the candidate individual population 116 (block 902). If all the samples haven't been considered, a new sample 702 is selected from the training data database 114 (block 904). If all the individuals 800 in from the candidate individual population 116 have been considered (block 924), the candidate testing module 604 ends the training (block 926).

Note that FIG. 9 shows aggregation of per-data-point fitness scores occurring after the current individual is applied to each data point in the current sample (block 916), and aggregation of per-sample fitness scores occurring by averaging (block 920). Strict averaging in block 920 sequence may not be appropriate if, for example, the number of data points can vary among the samples. In such an embodiment, the averaging performed in block 920 may be weighted in accordance with the number of data points in each sample, in order to accord equal weight to all of the per-data-point fitness scores. In some embodiments, therefore, the number of data points represented in each fitness score is maintained as a separate count in conjunction with that fitness score, so that appropriate weighting can be performed when fitness scores are merged.

In one embodiment, the aggregation of per-data-point fitness scores in block 916 may simply constitute adding each new per-data-point fitness score to a prior sum, and incrementing by 1 a corresponding count of fitness scores represented by the sum. The per-sample fitness score is then represented by two values: the sum and the number of data points represented in the sum. The average, which is simply the sum divided by the count, need not be actually calculated until all testing on the individual is complete. In fact, in some embodiments the two values (sum and count) can be maintained separately through all testing of all data points in a plurality of samples; no demarcation need be noted with respect to either value to mark the transitions across data samples-even data samples from different patients (i.e., block 920 can be omitted or moved to a position much further downstream in the training). This variation is especially useful in embodiments in which the fitness evaluation of an individual is distributed across many distributed computers. See, for example, the above-incorporated U.S. Pat. No. 9,466,023 (GNFN 3100-1).

When the training phase is completed for the current generation of individuals, the individuals are compared to each other based on the fitness score, and the fittest individuals are retained in the candidate individual population, and others may be discarded or otherwise marked for discarding. Then, individuals are selected from the individuals retained in the pool for use in procreation. New individuals are created and placed in the candidate individual population, and this new generation of individuals is subjected to training.

When evolution is complete, one or more individuals are selected for use in production. The rulesets from these selected individuals may be moved into the production ruleset population.

Computer Hardware

Figure 10:
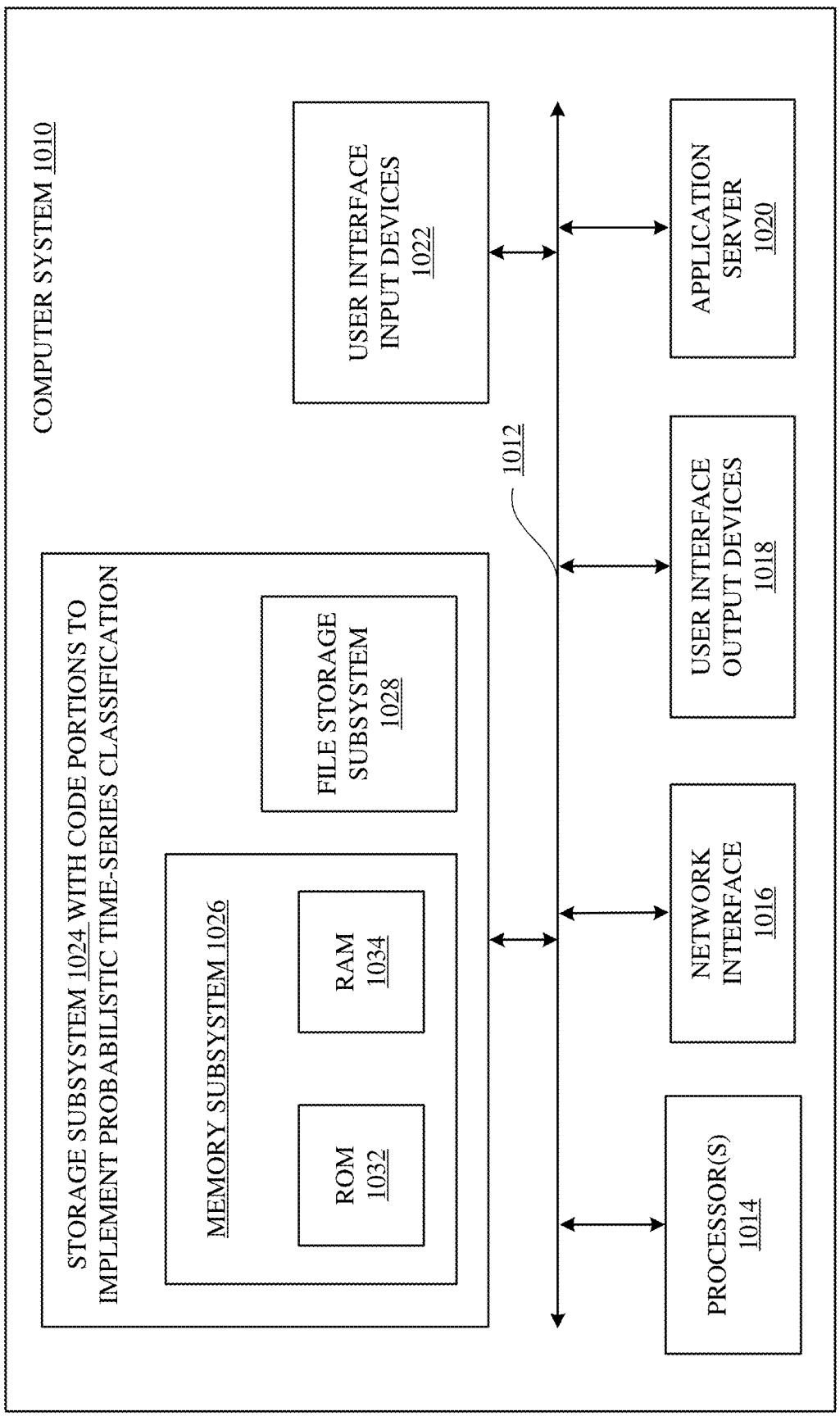
FIG. 10 is a simplified block diagram of a computer system that can be used to implement the components depicted in FIG. 1.

FIG. 10 is a simplified block diagram of a computer system that can be used to implement the components depicted in FIG. 1. Computer system 1010 typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network or combination of computer networks.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system. In particular, an output device of the computer system 1010 on which production system 112 is implemented may include a visual output informing a user of action recommendations made by the system, or may include a communication device for communicating action signals directly to the decision/action system 128. Additionally or alternatively, the communication network 1018 may communicate action signals to the decision/action system 128. In the financial asset trading environment, for example, the communication network 1018 transmits trading signals to a computer system in a brokerage house which attempts to execute the indicated trades.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor subsystem 1014. Storage subsystem 1024 also stores the candidate individual pool 116, training data 114, and the production ruleset population 122. Alternatively, one or more of such databases can be physically located elsewhere, and made accessible to the computer system 1010 via the communication network 1018.

Memory subsystem 1026 typically includes a number of memories including a main random access memory (RAM) 1034 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer", execute on the processor subsystem 1014 in response to computer instructions and data in the host memory subsystem 1026 including any other local or remote storage for such instructions and data.

As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1010 depicted in FIG. 10 is intended only as a specific example for purposes of illustrating the preferred embodiments of the present invention. Many other configurations of computer system 1010 are possible having more or less components than the computer system depicted in FIG. 10.

Alternate Embodiments

There are many embodiments evolving individuals in an evolutionary algorithm. The approach described herein may be implemented by any of the following embodiments.

In an embodiment, the evolutionary algorithm is distributed across multiple computers. The computers may be assigned a role of coordinator, mid-level coordinator, or evolutionary engine in which an evolutionary engine initializes, procreates, tests, and scores individuals, and coordinators compare individuals across evolutionary engine. This is a federated approach. See, for example, the above-incorporated U.S. Pat. No. 9,466,023 (GNFN 3100-1).

In an embodiment, the number of training data samples or an individual is tested against is tracked in an indication of experience level, and only those individuals with similar experience levels are permitted to compete with each other for a place in the candidate pool. See, for example, the above-incorporated U.S. Pat. No. 8,909,570 (GNFN 3010-1). The individuals selected as parents for procreation are selected from among the best scoring of the most experienced individuals.

In an embodiment, parents involved in procreation are removed from the candidate pool, and in other embodiments, they remain in the candidate pool.

In an embodiment, an individual is assigned a novelty score that is used to select which individuals to retain in the candidate pool and which to discard. Using the novelty score for competition favors a set of individuals that are most different (novel) from each other.

In an embodiment, an individual's fitness score may be retained and further refined across generations as an individual is tested against new training data. In an embodiment, previous fitness scores are not used and a new fitness score is determined based only on the performance of the testing data of the current generation.

In an embodiment, an individual can also contain or identify a history of the separate fitness trials to which the individual has been subjected. Such a fitness history can be used to avoid re-testing the individual on the same data sample, or can be used to remove the effect of duplicate tests performed on an individual in different testing batteries before merging the fitness evaluations. It can also be used to help diversify the candidate pool, by comparing or weighting individuals not only on their overall fitness evaluations, but also on the way they reached their overall fitness evaluations. Fitness trial history also can be taken account when filtering the final pool of individuals for selection for deployment.

Many other variations will be apparent to the reader.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method implemented on a data mining system for determining a basis on which a decision can be made, for use in response to input data comprising an ordered sequence of data points, the method comprising:

evolving, by one or more computer systems of the data mining system programmed with an evolutionary algorithm, a ruleset for determining the basis on which a decision can be made, the programmed evolutionary algorithm including at least the following steps: generating an initial population of candidate rulesets, evaluating at least a portion of the candidate rulesets in the initial population; removing certain candidate rulesets from the initial population based on a fitness determination; procreating new candidate rulesets using the candidate rulesets remaining in the initial population; repeating the evaluating, removing and procreating on the new and remaining candidate rulesets over multiple iterations; and selecting a subject ruleset after completion of the multiple iterations;

providing to the one or more computer systems of the data mining system programmed to apply a ruleset to input data the ruleset from the selected subject ruleset having a plurality of rules, each of the rules having a plurality of conditions and an indication of a rule-level probability of a predetermined classification, each of the conditions indicating a relationship between a respective input feature and a corresponding value for the input feature;

the computer system determining a condition-level certainty value for each of the conditions of each of the rules, the condition-level certainty value for each given one of the conditions indicating an extent to which the relationship of the given condition is satisfied by input data;

determining a rule-level certainty value for each given one of the rules in dependence upon the condition-level certainty values of the conditions of the given rule;

determining a probability output of the ruleset in dependence upon the rule-level probabilities and the rule-level certainty values determined for each rule in the ruleset, wherein determining the probability includes calculating an average of the rule-level probabilities of the rules in the ruleset, each weighted by the rule's corresponding rule-level certainty value; and reporting the probability output of the ruleset for the input data for use in decision making.

2. The method of claim 1, wherein determining a condition-level certainty value for each of the plurality of conditions of each of the rules comprises determining a fuzzy condition-level certainty value for at least of one of the conditions of at least one of the rules.

3. The method of claim 2, wherein determining a condition-level certainty value for each of the conditions of each of the rules comprises determining a fuzzy condition-level certainty value for each of the conditions of each of the rules.

4. The method of claim 1, wherein determining a condition-level certainty value for each of the plurality of conditions of each of the rules comprises determining a binary condition-level certainty value for at least of one of the conditions of at least one of the rules.

5. The method of claim 1, wherein determining a rule-level certainty value for the given rule comprises determining the rule-level certainty value as a minimum value among the condition-level certainty values of the conditions in the given rule.

6. The method of claim 1, wherein determining a probability output for the ruleset comprises calculating the probability output such that:

$$\text{probability output} = \frac{\sum_r (RLCV_r \cdot RLP_r)}{\sum_r RLCV_r}$$

where:
  $RLCV_r$ is the rule-level certainty value for rule r of the ruleset;
  $RLP_r$ is the rule-level probability for rule r of the ruleset; and
  r ranges through all rules of the ruleset.

7. The method of claim 1, wherein the input feature of a condition represents the value of a feature in one data point in the ordered sequence of data points, wherein the one data point is identified based on a position thereof in the ordered sequence.

8. The method of claim 7, wherein the position in the ordered sequence is identified relative to a last data point in the sequence.

9. The method of claim 7, wherein the ordered sequence of data points is time sequence data, each data point representing a point in time; and the predetermined classification is true when a predetermined event has occurred.

10. The method of claim 1 wherein the relationships indicated in the rules of the ruleset are all members of the group consisting of:
  equal to ("="), less than ("<"), less than or equal to ("<="), greater than (">"), greater than or equal to (">="), and not equal to ("!=").

11. The method of claim 1, wherein the relationships indicated in the rules of the ruleset are all members of a group consisting of less than("<") and not less than("!<").

12. The method of claim 1, wherein determining a condition-level certainty value for each particular one of the conditions of each of the rules comprises applying a function to the value for the input feature of the particular condition, the function being dependent upon a predetermined range of values associated with the input feature, and the relationship in the condition.

13. The method of claim 1, wherein the decision based on the probability output of the ruleset is made by a computer processor based on a one or more predetermined threshold values.

14. The method of claim 1, wherein the decision based on the probability output of the ruleset is made by a human.

15. The method of claim 1, wherein the decision is made by choosing one of a plurality of actions in dependence on comparing the probability output of the ruleset to a plurality of thresholds.

16. The method of claim 1, wherein the output of the method is used to decide a member of the group consisting of:
  whether to perform a medical intervention;
  whether to announce an anticipated weather condition; and
  whether to take precautions in advance of an anticipated natural disaster.

17. The method of claim 1, wherein evolving the ruleset further includes:
  providing to the one or more programmed computer systems samples of training data, each sample of the training data comprising an ordered sequence of data points, each of the data points identifying values for a plurality of input features and further identifying an outcome indicating whether a predetermined classification is true at that data point;
  generating and storing in a candidate pool an initial population of individuals, each individual in the candidate pool identifying a ruleset having a respective plurality of rules, each of the rules having a plurality of conditions and an indication of a rule-level probability of the predetermined classification, each of the conditions indicating a relationship between one of the input features and a corresponding value for the input feature;
  evaluating by the one or more programmed computer systems each given individual in at least a subset of the individuals in the candidate pool by determining a fitness score therefore, in dependence upon application of the rules of the given individual to the data points from at least one sample of the training data;
  removing from the candidate pool a portion of the individuals from the candidate pool in dependence upon their respective fitness scores;
  procreating new individuals using selected individuals remaining in the candidate pool and adding new individuals to the candidate pool;
  repeating the evaluating, removing and procreating on all individuals in the candidate pool over multiple iterations; and
  selecting a subject individual, including the ruleset, from the individuals remaining in the candidate pool after completion of the multiple iterations.

18. The method of claim 17, wherein the initial population of individuals is created by generating a set of rules, each rule created by:
  creating one or more conditions, each condition generated by:
    randomly selecting an input feature from a plurality of input features and a time point from a range of time points,
    randomly selecting a value corresponding to the selected input feature, and
    randomly selecting a relationship between the selected input feature and the selected value corresponding to the input feature; and
  randomly selecting a rule-level probability from a set of discrete probability values.

19. The method of claim 17, wherein determining a fitness score for each given individual in dependence upon application of the rules of the given individual to the data points from at least one sample of the training data comprises:
  applying the rules of the given individual to each of the data points in at least one sample of the training data to determine per-data-point fitness scores for the given individual, and
  combining the per-data-point fitness scores for the given individual.

20. The method of claim 19, wherein determining the per-data-point fitness for the given individual comprises:
  developing a probability output for the given individual and for the given data point in dependence upon the rule-level probabilities for each rule of the given individual;
  determining the per-data-point fitness of the given individual as a first function of the probability output for the given individual responsive to the outcome indicated in the given data point indicating that the predetermined classification is true at the given data point; and determining the per-data-point fitness of the given individual as a second function of the probability output for the given individual responsive to the outcome indicated in the given data point indicating that the predetermined classification is not true at the given data point;

wherein the first function and the second function are distinct monotonic functions.

21. The method of claim 17, wherein evolving the subject individual further comprises, after repeating the steps of evaluating and removing, repeating the steps of procreating, evaluating and removing for at least one further iteration prior to the step of selecting the subject individual.

* * * * *